United States Patent [19]

Sekinoo et al.

[11] Patent Number: 4,763,812
[45] Date of Patent: Aug. 16, 1988

[54] HOPPER STRUCTURE

[75] Inventors: Koichi Sekinoo; Hiroshi Harada, both of Soma, Japan

[73] Assignee: Alps Electric Co., Ltd., Japan

[21] Appl. No.: 1,015

[22] Filed: Jan. 7, 1987

[30] Foreign Application Priority Data

Feb. 26, 1986 [JP] Japan .............................. 61-27060[U]

[51] Int. Cl.⁴ ............................................... B65H 3/60
[52] U.S. Cl. .................................... 221/203; 221/238; 221/263; 221/264; 221/276; 221/290
[58] Field of Search ............... 221/200, 263, 264, 289, 221/290, 292, 293, 298, 299, 183, 184, 202, 203, 236, 238, 268, 276, 68, 180, 179, 176; 222/226, 243, 245, 248, 408.5, 425, 449, 451

[56] References Cited

U.S. PATENT DOCUMENTS

| | | | |
|---|---|---|---|
| 1,095,407 | 5/1914 | Lawson | 221/68 X |
| 1,252,562 | 1/1918 | Fassinger | 221/298 X |
| 1,632,852 | 6/1927 | Richter | 221/184 X |
| 1,657,694 | 1/1928 | Parker | 221/200 X |
| 2,072,923 | 3/1937 | Schutsch et al. | 221/202 X |
| 2,752,065 | 6/1956 | Schupp | 221/202 X |
| 3,275,191 | 9/1966 | MacDonald | 221/264 X |
| 3,706,395 | 12/1972 | Havener et al. | 221/176 X |
| 4,457,451 | 7/1984 | Ichikawa | 221/200 X |

FOREIGN PATENT DOCUMENTS

| | | | |
|---|---|---|---|
| 340418 | 5/1936 | Italy | 221/183 |
| 180511 | 8/1962 | Sweden | 221/178 |

Primary Examiner—Joseph J. Rolla
Assistant Examiner—David H. Bollinger
Attorney, Agent, or Firm—Guy W. Shoup; Glenn Ostrager; Leighton K. Chong

[57] ABSTRACT

Herein disclosed is a hopper structure which is in a hopper structure for separating chip parts, a swing roll is hopper body which has its lower spout merging into a lining-up cylindrical hole formed in a lining-up block. The swing roll is formed at its outer periphery with an arcuate mixing projection which has its upper end face positioned in the upper mouth of the lining-up cylindrical hole. There is provided a drive mechanism for bringing the swing roll into swinging motions of an angle smaller than the arcuate angle of the mixing projection.

5 Claims, 3 Drawing Sheets

HOPPER STRUCTURE

BACKGROUND OF THE INVENTION

1. Field of the Invention

The present invention relates to a hopper and, more particularly, to a hopper structure to be used for supplying chip parts without terminals.

2. Description of the Prior Art

A hopper structure known in the prior art will be described with reference to FIG. 2.

Denoted at reference numeral 1 in FIG. 2 is a hopper body for holding chip parts 2 thrown thereinto. This hopper body 1 is mounted on a mounting bed 4 through a lining-up block 3. The mounting bed 4 has its end portion bent upright to form a support stand 4a which bears a drive roll 5 of rubber at its upper end.

Denoted at numeral 6 in FIG. 2 is a driven roll which has a portion exposed to the inside of the aforementioned hopper body 1. A weighted lid 7 is placed on the top of the hopper body 1 so that the driven roll 6 may be urged against the aforementioned drive roll 5. Moreover, the driven roll 6 is diametrically symmetrically cut off to form a pair of mixing projections 6a and 6a which are made movable in a floating state.

Still moreover, the lining-up block 3 underlying the hopper body 1 is formed with: a lining-up cylindrical hole 3a merging in alignment into the lower spout of the hopper body 1; and a chute 3b out of alignment with the lining-up cylindrical hole 3a. Between the chute 3b and the lining-up cylindrical hole 3a, there is interposed a shutter 3e which is formed with a through hole 3d and biased by a spring 3c to slide to the right and left.

The hopper structure of the prior art has the construction described above. The chip parts 2 are thrown into the hopper body 1, and the drive roll 5 is turned counter-clockwise, as indicated by an arrow. Then, the driven roll 6 urged by the drive roll 5 is turned clockwise, as indicated by an arrow, so that the chip parts 2 are so mixed by the mixing projections 6a and 6a extending from the driven roll 6 that they may be released from any entanglement until they are allowed to drop one by one into the lining-up cylindrical hole 3a of the lining-up block 3. The chip parts 2 thus lined up in the cylindrical hole 3a are delivered to slide one by one into the chute 3b by the through hole 3d of the shutter 3e.

In this hopper structure of the prior art, however, the mixing projections 6a and 6a are rubbed, while turning, by the lining-up block 3 and the hopper body 1 so that they are ground or buckled. Due to limitations to the shape of the mixing projections 6a and 6a, moreover, shavings are formed which deteriorate the reliabilities of the line-up, separation and dropping of the chip parts 2 and the mixing effect of the chip parts 2. As a result, the service life of the hopper is shortened.

In case a plurality of hoppers are to be driven by the single drive roll 5, this drive roll 5 is made of rubber so as to absorb the minute dispersions of the positional accuracy and diameter of the driven rolls 6. As a result, the drive roll 5 wears so that its tailings are trapped by the hopper body 1 to cause deterioration in the reliabilities of the line-up, separation and dropping of the chip parts 2. This shortens the lifetime of the drive roll 5 itself and makes it necessary to provide the weighted lid 7 for setting on the hopper. Due to the presence of the weighted lid 7, it takes additional time to disassemble the hopper, and the driven rolls 6 are seriously loaded so that the reliability of their turning movement is affected.

SUMMARY OF THE INVENTION

The present invention has been conceived noting the aforementioned problems intrinsic to the prior art and has an object to solve those problems and to provide a hopper structure which is intended to improve the reliabilities of the line-up, separation and drop of the chip parts, to extend the lifetimes of the hopper and the drive parts, and to eliminate the presence of the weighted lid for the hopper.

In order to achieve the above-specified object, there is provided a hopper structure for supplying chip parts, comprising: a hopper body having a lower spout for holding the chip parts; a lining-up block having a lining-up cylindrical hole merging into the lower spout of said hopper body; a swing roll having a portion exposed to the inside of said hopper body and its outer periphery formed with an arcuate mixing projection having its upper end face positioned in the upper mouth of the lining-up cylindrical hole of said lining-up block for raising the chip parts, even if entangled, to allow the same to drop one by one in alignment into the lining-up cylindrical hole of said lining-up block; and drive means for rotating said swing roll through an angle smaller than the arcuate angle of the mixing projection of said swing roll.

With this construction, it is possible to improve the reliabilities of the line-up, separation and dropping of the chip parts, to extend the lifetimes of the hopper and the drive parts, and to eliminate the presence of the weighted lid for the hopper.

DESCRIPTION OF THE PREFERRED EMBODIMENT

Next, one embodiment of the present invention will be described in detail with reference to FIG. 1.

Figure 1:
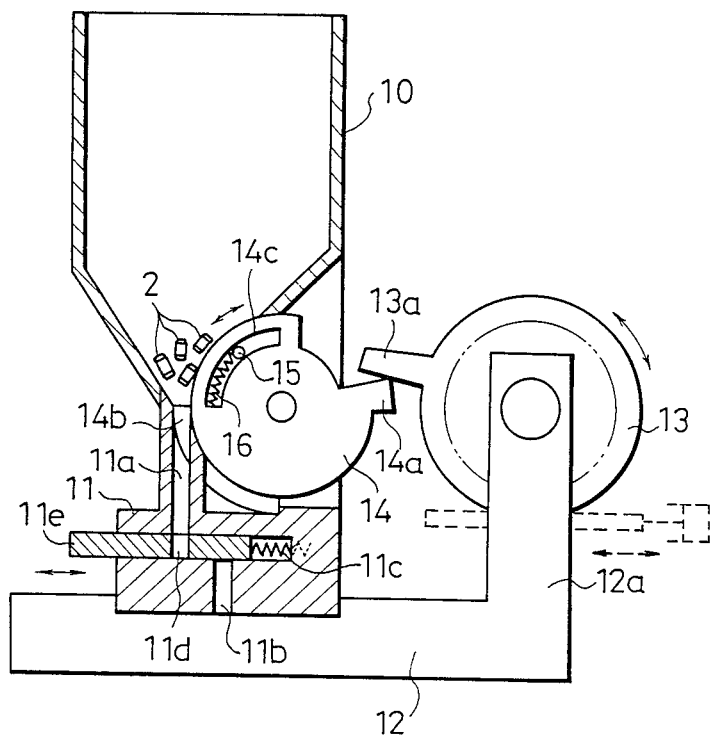
FIG. 1 is a longitudinal section showing the hopper structure embodying the present invention.

Denoted at reference numeral 10 in FIG. 1 is a hopper body which is mounted on a mounting bed 12 through a lining-up block 11. The mounting bed 12 has its end portion bent upright to form a support stand 12a which is equipped at its upper end with a drive member 13 having a lever 13a.

Figure 1A:
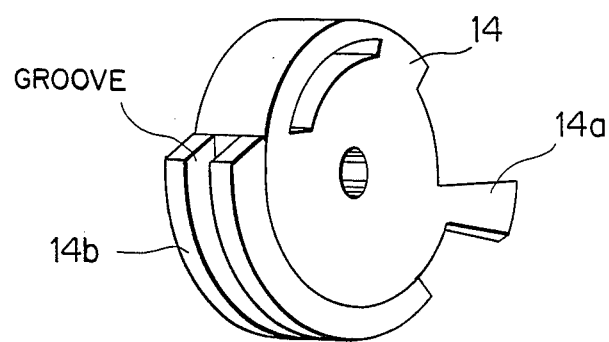
FIG. 1a is a perspective view of a swing roll shown in FIG. 1.
Figure 2:
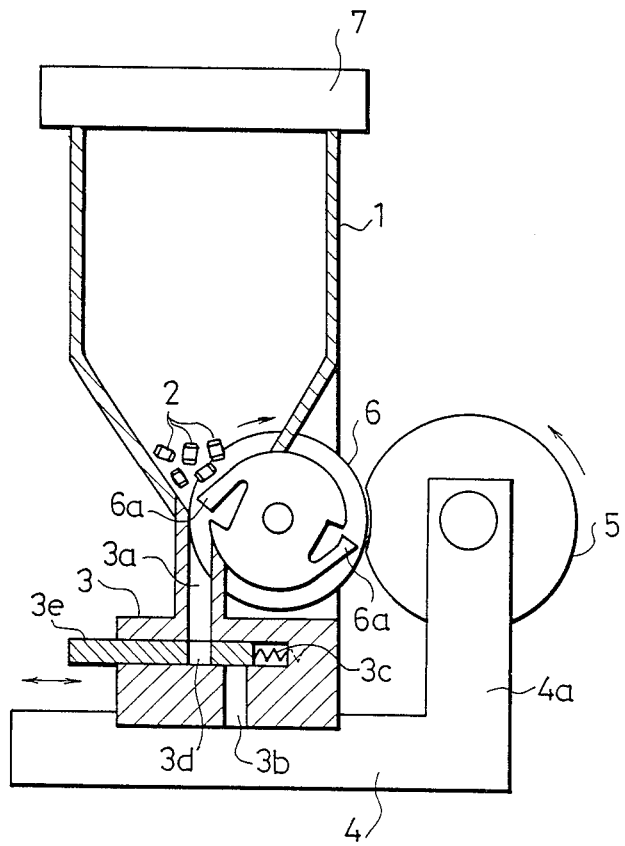
FIG. 2 is a longitudinal section showing the hopper structure of the prior art.

On the other hand, numeral 14 denotes a swing roll which has a portion exposed to the inside of the aforementioned hopper body 10. This swing roll 14 is partially cut off to form a follower lever 14a which is in abutting contact with the lever 13a of the aforementioned drive member 13. The swing roll 14 is further formed at its outer periphery with an arcuate mixing projection 14b which is located in a position generally diametrically symmetric to the aforementioned follower lever 14a. The mixing projection 14b is arranged to have its upper end face positioned in the upper mouth of a lining-up cylindrical hole 11a which is so formed in the aforementioned lining-up block 11 as to merge in alignment with the spout of the hopper body 10. As shown in FIG. 1a, the mixing projection 14b is formed with a groove, through which the chip parts 2 thrown into and held in the hopper body 10 are guided to pass into the groove one by one. The swing roll 14 is further formed along its outer periphery with an arcuate slot 14c in which a stopper pin 15 is arranged. A return spring 16 is sandwiched between that stopper pin 15 and one end of the arcuate slot 14c.

Still moreover, the lining-up block 11 underlying the hopper body 10 is constructed similarly to the prior art and formed with the aforementioned lining-up cylindrical hole 11a and a chute 11b which is out of alignment with the lining-up cylindrical hole 11a. Between the chute 11b and the lining-up cylindrical hole 11a, there is interposed a shutter 11e which is formed with a through hole 11d and biased by a spring 11c to slide to the right and left.

The hopper structure according to the present invention has the construction described above. The chip parts 2 are thrown into the hopper body 10, and the drive member 13 is turned counter-clockwise. Then, the lever 13a pushes down the follower lever 14a of the swing roll 14 so that the swing roll 14 turns clockwise until it abuts against the stopper pin 15. The entangled chip parts 2 are raised and released from their entangled state by the mixing projection 14b so that the separate chip parts 2 are allowed to drop one by one through the groove of the mixing projection 14b and to line up in the lining-up cylindrical hole 11a. The swing roll 14 is made to turn within an angle smaller than the arcuate angle of the mixing projection 14b by the stopper pin 15 and to swing back to its initial position by the action of the return spring 16 when its follower lever 14a disengages from the lever 13a of the drive member 13.

The chip parts 2 lined up in the lining-up cylindrical hole 11a are introduced one by one like the prior art into the through hole 11d of the shutter 11e so that the chip part 2 thus introduced is allowed to drop into the chute 11b when the shutter 11e slides to the right. The shutter 11e per se is returned by the spring 11c.

Incidentally, in the present embodiment, the lining-up cylindrical hole 11a can have a round or rectangular section, if necessary. On the other hand, the mechanism for swinging the swing roll 14 within the predetermined angle can be constructed such that the drive member 13 is exemplified by a roll formed with a pinion gear which is held in meshing engagement with a rack so that it may be reciprocated by means of a cylinder, as shown in phantom lines in FIG. 1.

As has been described hereinbefore, according to the present invention, since the components are freed from being ground or wearing, no shaving is formed, thereby keeping the mixing action effective and reliable. Without any positioning external force by the weighted lid, moreover, it is possible to improve the reliabilities of the line-up, separation and dropping of the chip parts. Since the mixing projection is fixed, it is freed from being buckled, thereby extending the lifetimes of the hopper body and the drive mechanism. Since the presence of the weighted lid is unnecessary, the disassembly time is shortened.

What is claimed is:

1. A hopper structure for supplying chip parts, comprising:
   a hopper body for holding chip parts having a lower spout;
   a lining-up block below the hopper having a lining-up hole communicating with the lower spout of the hopper body;
   a swing roll rotatably mounted to the hopper body having one peripheral portion disposed inside the hopper body proximate the lower spout, and an arcuate mixing projection extending over an arcuate angle of a peripheral portion of the swing roll which is disposed in the lining-up hole of the lining-up block, said arcuate mixing projection having a peripheral groove defined therein for passing chip parts therethrough one by one into the lining-up hole and a leading end face for raising and untangling the chip parts and passing the chip parts into the groove upon rotation of the the swing roll in one rotational direction; and
   drive means for rotating the swing roll in the one rotational direction through an angle which is smaller than the arcuate angle of the mixing projection of the swing roll.

2. A hopper structure according to claim 1, wherein said lining-up block further has a chute disposed out of alignment with said lining-up hole.

3. A hopper structure according to claim 2, further comprising feed means for feeding the chip parts one by one from said lining-up hole to said chute, said feed means including a shutter having a through hole and biased to slide back and forth for allowing the chip parts introduced into said lining-up hole to drop through said through hole into said chute.

4. A hopper structure for supplying chip parts, comprising:
   a hopper body for holding chip parts having a lower spout;
   a lining-up block below the hopper having a lining-up hole communicating with the lower spout of the hopper body;
   a swing roll rotatably mounted to the hopper body having one peripheral portion disposed inside the hopper body proximate the lower spout, and an arcuate mixing projection extending over an arcuate angle of a peripheral portion of the swing roll which is disposed in the lining-up hole of the lining-up block, said arcuate mixing projection having a peripheral groove defined therein for passing chip parts therethrough one by one into the lining-up hole and a leading end face for raising and untangling the chip parts and passing the chip parts into the groove upon rotation of the the swing roll in one rotational direction; and
   drive means for rotating the swing roll in the one rotational direction through an angle which is smaller than the arcuate angle of the mixing projection of the swing roll, including a rotating drive member outside the hopper body having a projecting lever thereon, a follower lever formed on another peripheral portion of the swing roll in a position generally diametrically opposite the arcuate mixing projection which is engages in abutting contact with the projecting lever of the rotating drive member so as to turn the swing roll in the one rotational direction, an arcuate slot formed along a peripheral part of the swing roll, a stopper pin projecting into the arcuate slot for stopping the turning of the swing roll, and a return spring provided between the stopper pin and one end of the arcuate slot for returning the swing roll when the follower lever of the swing roll disengages from the lever of the drive member.

5. A hopper structure according to claim 4, wherein said drive member has a roll formed with a pinion gear, and wherein said drive means further includes: a rack meshing with said pinion gear; and a cylinder connected to said rack for reciprocating the same to turn said roll through said pinion gear.

* * * * *

UNITED STATES PATENT AND TRADEMARK OFFICE
CERTIFICATE OF CORRECTION

PATENT NO. : 4,763,812

DATED : August 16, 1988

INVENTOR(S) : Koichi Sekinoo et al.

It is certified that error appears in the above-identified patent and that said Letters Patent is hereby corrected as shown below:

Title page:

In the Abstract, delete line 1 beginning with "Herein" through line 3, ending with "is" and insert --In a hopper structure for separating chip parts, a swing roll is disposed to have its portion exposed to the inside of a--.

Col. 4 line 51, "which is engages in" should read --engages in--.

Signed and Sealed this

Sixteenth Day of May, 1989

Attest:

DONALD J. QUIGG

*Attesting Officer*  *Commissioner of Patents and Trademarks*